US006484220B1

(12) United States Patent
Alvarez, II et al.

(10) Patent No.: US 6,484,220 B1
(45) Date of Patent: Nov. 19, 2002

(54) TRANSFER OF DATA BETWEEN PROCESSORS IN A MULTI-PROCESSOR SYSTEM

(75) Inventors: Manuel Joseph Alvarez, II, Austin, TX (US); Sanjay Raghunath Deshpande, Austin, TX (US); Kenneth Douglas Klapproth, Austin, TX (US); David Mui, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/383,736

(22) Filed: Aug. 26, 1999

(51) Int. Cl.[7] .................................................. G06F 3/02
(52) U.S. Cl. ............................ 710/46; 710/20; 710/33; 710/72; 710/268; 712/6; 711/147
(58) Field of Search ................................ 710/5, 20, 40, 710/46, 72, 56, 112, 44, 1, 7, 15, 19, 31, 33, 62, 64, 73, 268; 712/6; 370/352; 711/147, 114

(56) References Cited

U.S. PATENT DOCUMENTS

| 4,583,166 A | * | 4/1986 | Hartung et al. ............. 364/200 |
| 4,818,984 A | * | 4/1989 | Chang et al. ........... 340/825.54 |
| 5,333,265 A | * | 7/1994 | Orimo et al. ................ 395/200 |
| 5,825,773 A | * | 10/1998 | Shutoh et al. ............... 370/398 |
| 5,889,968 A | * | 3/1999 | Bennett et al. .............. 710/112 |
| 5,890,007 A | * | 3/1999 | Zinguuzi ........................ 712/6 |
| 6,011,791 A | * | 1/2000 | Okada et al. ................ 370/352 |
| 6,079,017 A | * | 6/2000 | Han et al. ........................ 712/2 |
| 6,185,662 B1 | * | 2/2001 | Beyerlein et al. ........... 711/147 |

* cited by examiner

Primary Examiner—Jeffrey Gaffin
Assistant Examiner—Rijue Mai
(74) Attorney, Agent, or Firm—Duke W. Yee; Volel Emile; Michael R. Nichols (57) ABSTRACT

A method for transferring data between devices in a computer system. In a preferred embodiment, a requesting device broadcasts a request for data. Each of a plurality of devices within the computer system responds to the request and indicates the location of the device and whether the device contains the requested data. The data is then transferred to the requesting device from one of the devices containing the data within the plurality of devices to the requesting device. The device selected to transfer the data to the requesting device has the closest logical proximity to the requesting device which results in a quick transfer of data.

35 Claims, 8 Drawing Sheets

TRANSFER OF DATA BETWEEN PROCESSORS IN A MULTI-PROCESSOR SYSTEM

BACKGROUND OF THE INVENTION

1. Technical Field

The present invention relates generally to computer software, and more particularly, to methods of transferring data between processors in a multiple processor data processing system wherein performance is maximized.

2. Description of Related Art

In a multi-processor system with local caches, when a bus device requests a piece of data, one of three conditions is possible. The first is that the requested data is not already present in the local caches of the other bus devices. In this situation, the data must be provided by the main memory. The second is that the requested data is present in the local cache of another bus device which has modified the data since it was fetched from the main memory. In this situation, the requesting device must retrieve the data from the device that has the modified copy of the data. This may be done either directly via a cache-to-cache transfer between the two bus devices or in an indirect fashion, i.e., force the other bus device to update the data in the main memory and then allow the new requesting bus device to fetch the updated data from the main memory. The third is that the requested data is present in the local cache of other bus device(s) that have not altered the data.

In the third case, some bus protocols allow one of the other bus devices to intervene in the memory access request and provide the data to the new requestor directly via a cache-to-cache transfer. Since such "shared-intervention" transfers can typically be accomplished in less time than a main-memory access, substantial performance improvements can be realized.

Furthermore, in some multi-processor systems, processors are grouped into multiple multi-processor nodes (i.e. two level clustering). Data transfers between processors on the same node can be accomplished with a much shorter request-to-data latency than data transfers from memory to the processor, which, in turn, have a shorter latency than transfers between processors on different nodes. As a result, it was desirable to implement a selective form of shared intervention. If a processor having a shared copy of the requested data is on the same node as the requesting processor, the shared intervention is allowed to proceed. Otherwise, the shared-intervention is blocked and the request is handled by the main memory unit. This mechanism allows the system to use a faster and more efficient method of servicing the data request.

However, in current methods of implementing shared response systems, selection of the processor to use to send the requested data to the requesting processor is based solely on the priorities of the responses received from all of the processors regarding which processors were in possession of the requested data. This sometimes results in shared interventions being awarded to processors on remote nodes which results in the longest read-to-data valid latency and requires higher utilization of system data busses and buffers. Thus, the overall effect when shared intervention is awarded to processors on remote nodes is a lower overall system bandwidth. Therefore, it is desirable to have a method and system of transferring data between processors of a multi-processor data processing system having improved efficiency.

SUMMARY OF THE INVENTION

The present invention provides a method for transferring data between processors in a multiple processor data processing system. In a preferred embodiment a request for data is received from a requesting processor at a transaction response collection and distribution logic unit. The request for data from the requesting processor is broadcast to all processors of the data processing system. The transaction response collection and distribution logic unit receives an individual response from each of the plurality of processors, wherein the individual response specifies the state of the requested data within a cache associated with the individual processor. The transaction response collection and distribution logic unit evaluates all received responses and provides each processor with an appropriate final response state. The final response state determines which processor and associated memory cache will send the requested data to the requesting processor or if the requested data will be provided from the system's main memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a method of transferring data between processors and may be implemented within a single data processing system containing multiple nodes, each having multiple processors. Alternatively, the present invention can be implemented across a plurality of data processing systems, wherein each data processing system contains multiple processors.

Figure 1:
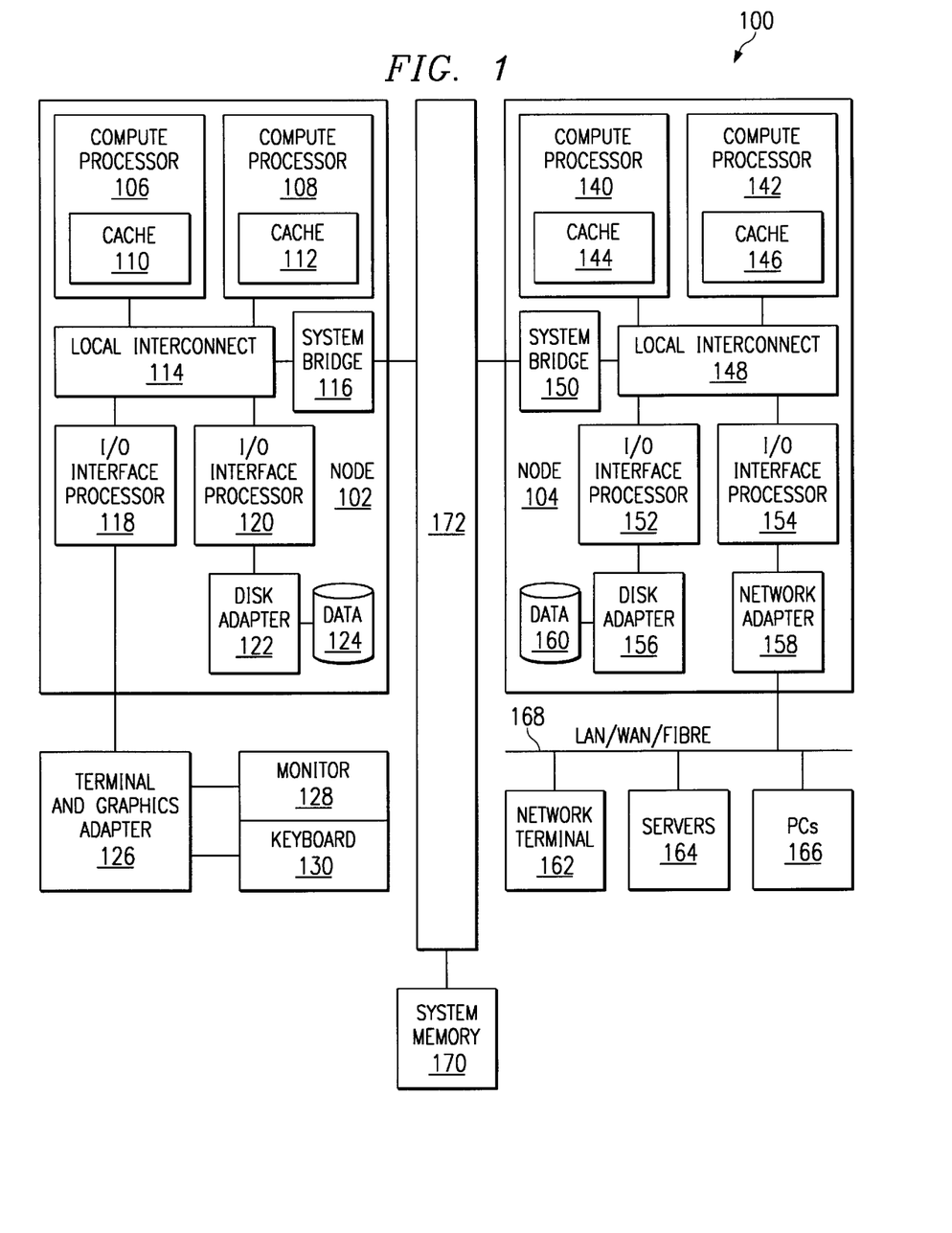
FIG. 1 shows a complete system-level perspective of multiple data processing systems in which the present invention may be implemented.

With reference now to the figures, and in particular with reference to FIG. 1, there is shown a complete system-level perspective of multiple data processing systems in which the present invention may be implemented. The system 100 consists of several processing nodes (data processing systems) 102 and 104 (which can be individual SMP servers) and a main memory unit 170, all interconnected by a system-level interconnect network (also referred to as a system switch) 172.

Processing node 102 contains a combination of computational processors 106 and 108 and IO interface processors 118 and 120. Computational processors 106 and 108 (e.g., IBM Power3 processor) typically contain one or more levels of internal or attached caches 110 and 112 to store instruction and data information for use by their internal computational units. IO interface processors 118 and 120 are used to connect to various peripheral devices, such as disk drive adapter 122 and terminal interface 126. IO interface processors 118 and 120 may or may not contain internal caches. Terminal interface 126 connects node 102 to monitor 128 and keyboard 130, which provide a user interface to node 102.

Compute processors 106 and 108 and IO interface processors 118 and 120 on node 102 are connected together and to the rest of the system 100 via a local interconnection 114 and system-bus bridge unit 116. The local interconnection 114 can be a point-to-point crossbar network or a common shared bus. The system bus bridge 116 connects the local interconnect network 114 to the system-level interconnection network 172.

Processing node 104 contains a combination of computational processors 140 and 142 and IO interface processors 152 and 154. Computational processors 140 and 142 (e.g., IBM Power3 processor) typically contain one or more levels of internal or attached caches 144 and 146 to store instruction and data information for use by their internal computational units. IO interface processors 152 and 154 are used to connect to various peripheral devices, such as disk drive adapter 156 and network adapter (LAN/WAN/Fibre-channel/Modems) 158. IO interface processors 152 and 154 may or may not contain internal caches. Network adapter 158 connects node 104 to communications path 168 which may be a LAN, WAN, or Fibre channel connection. Communications path 168 provides an interface between node 104 and network terminal 162, server 164, and data processing system 166.

Compute processors 140 and 142 and Input/Output (IO) interface processors 152 and 154 on node 104 are connected together and to the rest of the system 100 via a local interconnection 148 and system-bus bridge unit 150. The local interconnection 148 can be a point-to-point crossbar network or a common shared bus. The system bus bridge 150 connects the local interconnect network 148 to the system-level interconnection network 172.

The system-level interconnection network 172 can consist of a point-to-point crossbar network, a common shared bus, or a serial communication network. The latter is used in the case of the distributed implementation of the present invention.

Main memory 170 contains the total amount of shared data storage in the system 100. This storage is typically in the form of dynamic random access memory (DRAM).

In the single data processing system implementation (an example of a single multi-processor data processing system in accordance with the present invention is described below and shown in FIG. 2), the maximum performance is achieved when the local and system interconnects are high-speed parallel interfaces and the local-to-system and system-level interconnects are point-to-point crossbar networks.

In the distributed data processing implementation shown in FIG. 1, the nodes 102 and 104 can be individual symmetric multi-processor servers connected via a high-speed LAN 172 to each other and to a central system memory unit 170. The LAN connection 172 can be either daisy-chained in a circular fashion between all nodes and memory, or it may be point-to-point LAN connections to the system memory unit, which would contain multiple LAN interfaces and the corresponding interconnection logic, to allow any node to communicate with any other node.

Figure 2:
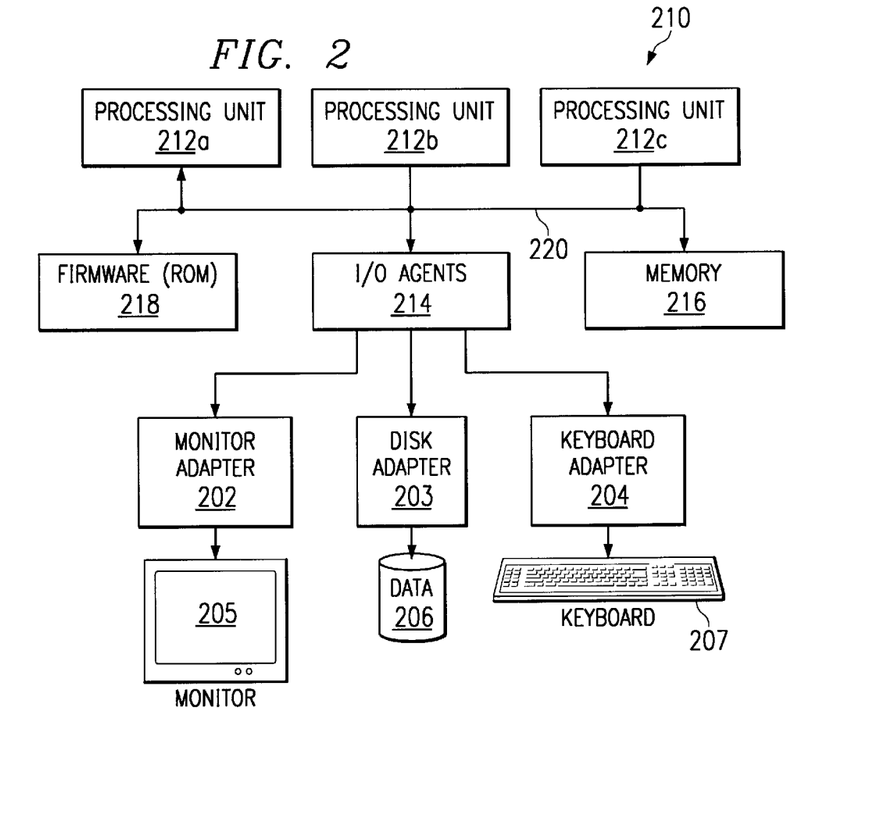
FIG. 2 depicts the basic structure of a conventional multiprocessor computer system.

With reference now to FIG. 2, the basic structure of a conventional multiprocessor computer system 210 is depicted. Computer system 210 has several processing units 212a, 212b, and 212c which are connected to various peripheral devices, including input/output (I/O) agents 214, which accept data from and provide data to a monitor adapter 202 and display monitor 205, keyboard adapter 204 and keyboard 207, and disk adapter 203 and permanent storage device 206, memory device 216 (such as dynamic random access memory or DRAM) that is used by the processing units to carry out program instructions, and firmware 218 whose primary purpose is to seek out and load an operating system from one of the peripherals (usually the permanent memory device) whenever the computer is first turned on. Processing units 212a–212c communicate with the peripheral devices by various means, including bus 220. Computer system 210 may have many additional components which are not shown, such as serial and parallel ports for connection to peripheral devices, such as modems or printers. Those skilled in the art will further appreciate that there are other components that might be used in conjunction with those shown in the block diagram of FIG. 2; for example, a display adapter might be used to control a video display monitor, a memory controller can be used to access memory 216, etc. In addition, computer system 210 may be configured with more or fewer processors. Other embodiments of the present invention may be implemented in other types of data processing systems, such as mainframes, servers, workstations, network computers, Internet appliances, palm computers, etc.

In a symmetric multiprocessor (SMP) computer, all of the processing units 212a–212c are generally identical; that is, they all use a common set or subset of instructions and protocols to operate and generally have the same architecture.

Figure 3:
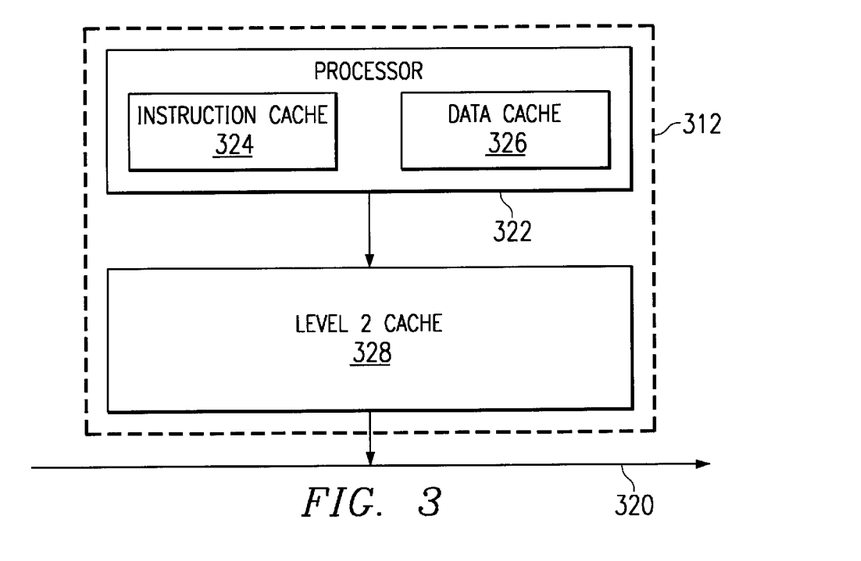
FIG. 3 depicts a typical organization of a processor.

With reference now to FIG. 3, a typical organization is depicted. A processing unit 312 includes a processor 322 having a plurality of registers and execution units which carry out program instructions in order to operate the computer. The processor can also have caches, such as an instruction cache 324 and a data cache 326. These caches are referred to as "on-board" when they are integrally packaged with the processor's registers and execution units. Caches are commonly used to temporarily store values that might be repeatedly accessed by a processor, in order to speed up processing by avoiding the longer step of loading the values from memory, such as memory 216 shown in FIG. 2.

Processing unit 312 can include additional caches, such as cache 328. Cache 328 is referred to as a level 2 (L2) cache since it supports the on-board (level 1) caches 324 and 326. In other words, cache 328 acts as an intermediary between memory 216 and the on-board caches, and can store a much larger amount of information (instructions and data) than the on-board caches, although at a longer access penalty. For example, cache 328 may be a chip having a storage capacity of 256 or 512 kilobytes, while the processor 312 may be an IBM PowerPC™ Power3-series processor having on-board caches with 96 kilobytes of total storage. Cache 328 is connected to bus 320, and all loading of information from memory 216 into processor 312 must come through cache 328. Although FIG. 3 depicts only a two-level cache hierarchy, multi-level cache hierarchies can be provided where there are many levels of serially connected caches.

Figure 4:
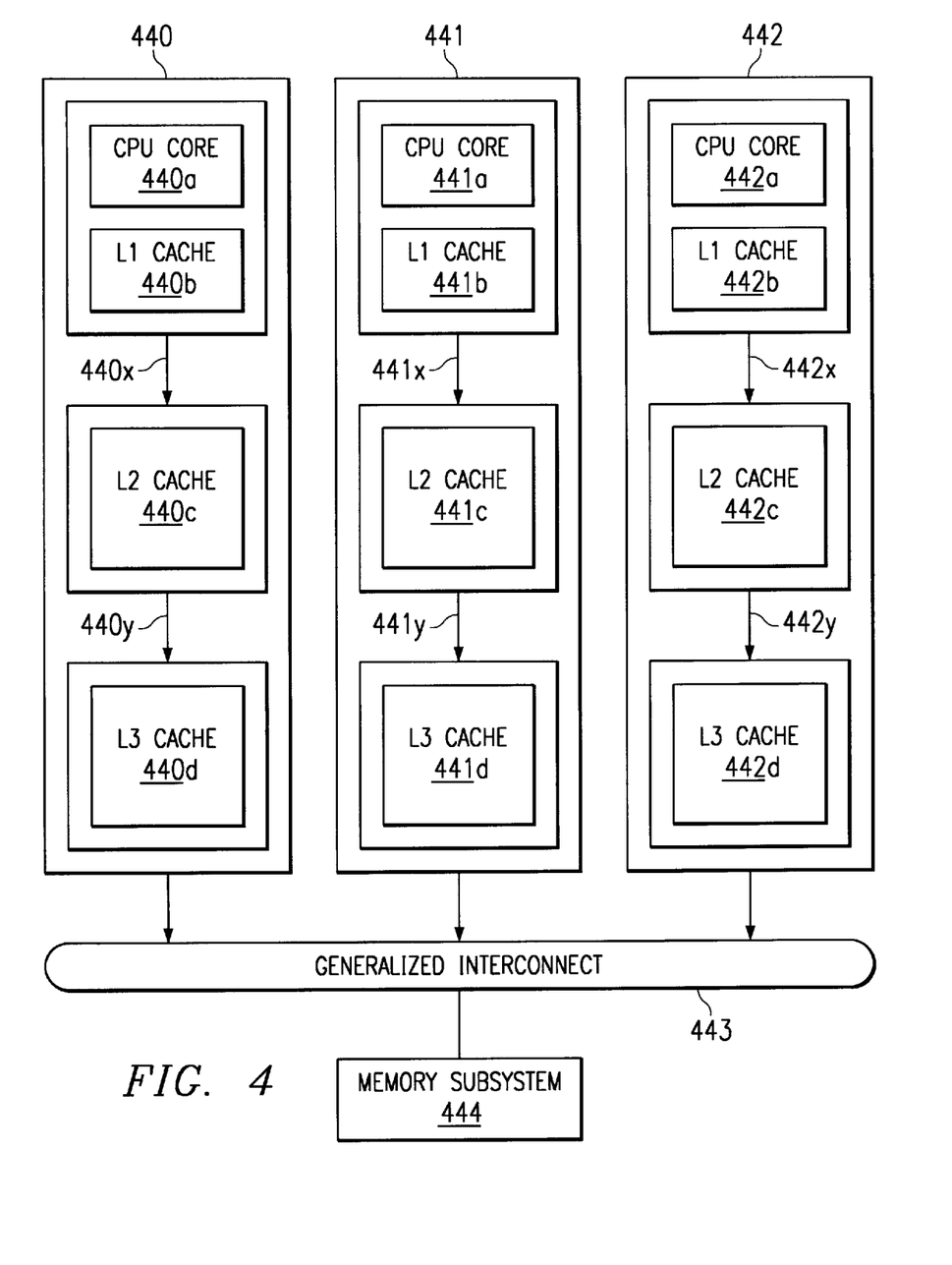
FIG. 4 depicts a computer system with three processing units.

With reference now to FIG. 4, a computer system is depicted with three processing units (440, 441, 442) consisting of processors (440a, 441a, 442a) each having an L1 cache (440b, 441b, 442b) connected to an L2 cache (440c, 441c, 442c) via an inter-cache connection (440x, 441x, 442x), which is connected to an L3 cache (440d, 441d, 442d) via an inter-cache connection (440y, 441y, 442y). Each cache within and/or attached to each processor is used to locally store copies of instructions and data from memory subsystem 444 so that such information can be more quickly accessed by the processor. Additionally, the aggregate cache capacity within and/or attached to a processor may be divided into multiple levels of cache as depicted in FIG. 4. Each cache level farther removed from the processor usually has the characteristics of larger capacity at the expense of longer access delays (i.e. slower).

The processors communicate over generalized interconnect 443. The processors pass messages over the interconnect indicating their desire to read or write memory locations. When a memory transaction is placed on the interconnect, all of the other processors receive and record this transaction and decide if the state of their caches can allow the requested transaction to proceed and, if so, under what conditions. This communication is necessary because, in systems with caches, the most recent valid copy of a given block of memory may have moved from memory subsystem 444 to one or more of the caches in the system (i.e. modified state). When a processor wishes to read or write a block, it must communicate that desire with the other processing units in the system in order to maintain cache coherence. To achieve this, the cache-coherence protocol associates, with each block in each level of the cache hierarchy, a status indicator indicating the current "state" of the block. The state information is used to allow certain optimizations in the coherency protocol that reduce transaction traffic on generalized interconnect 443 and inter-cache connections 440x, 440y, 441x, 441y, 442x, 442y. As one example of this mechanism, when a processing unit executes a read transaction, it receives a message or signals indicating whether or not the read transaction must be retried later. If the read transaction is not retried, the message usually also includes information allowing the processing unit to determine if any other processing unit also has a still active copy of the block (this is accomplished by having the other lowest-level caches give a "shared," "not shared," or "modified" indication for any read transaction they do not retry).

Figure 5:
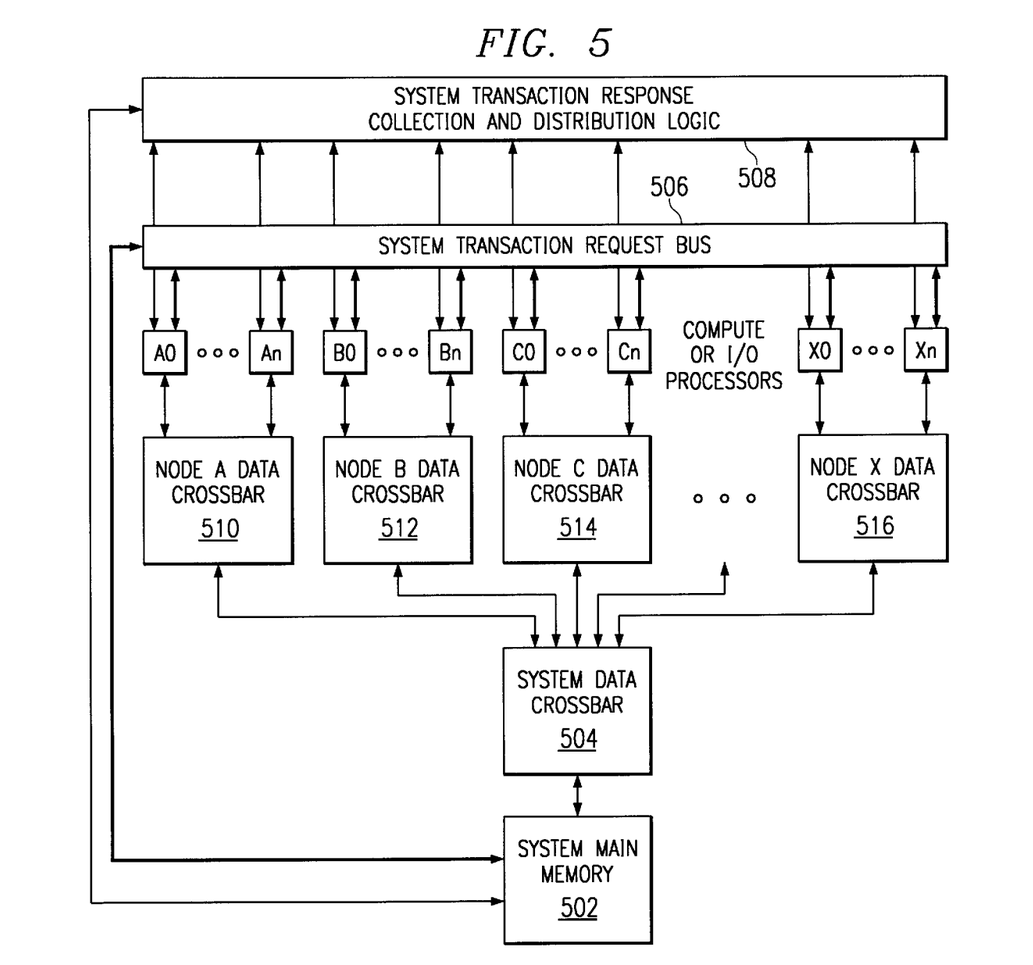
FIG. 5 shows a block diagram of multiple processors connected to a main memory system illustrating the processes of the present invention.

Turning now to FIG. 5, there is shown a block diagram illustrating multiple processors connected to a main memory system. The present invention is applicable to systems in which processors are grouped into multiple multi-processor nodes (i.e., multi-level clustering) as shown in FIG. 5 both within a single data processing system and within multiple data processing systems as depicted in FIG. 1. Throughout this description, the term "processor" refers to either computational processors or Input/Output (I/O) processors. In both cases, processors are assumed (but not required) to incorporate an internal or local cache.

The system consists of one to x nodes, with each node containing from two to n processors A0, An, B0, Bn, C0, Cn, X0, and Xn. Processors A0, An, B0, Bn, C0, Cn, X0, and Xn on a given node are connected together and to the rest of the system via a node-level crossbar data switch 510, 512, 514, and 516. The one to x processor nodes are connected to each other and to main memory via a system-level crossbar data switch 504.

A functionally common transaction request bus 506 connects to all processors A0, An, B0, Bn, C0, Cn, X0, and Xn and to main memory 502. It affords each processor A0, An, B0, Bn, C0, Cn, X0, and Xn visibility to every other processor's requests for data to assure cache coherency is maintained.

A response collection and distribution unit 508 collects the cache coherency responses from each of the processors A0, An, B0, Bn, C0, Cn, X0, and Xn in the system and from main memory. It evaluates the individual responses to determine which aggregate response type is required to preserve coherency in the system. It then communicates that response back to each processor A0, An, B0, Bn, C0, Cn, X0, and Xn and main memory.

Figure 6:
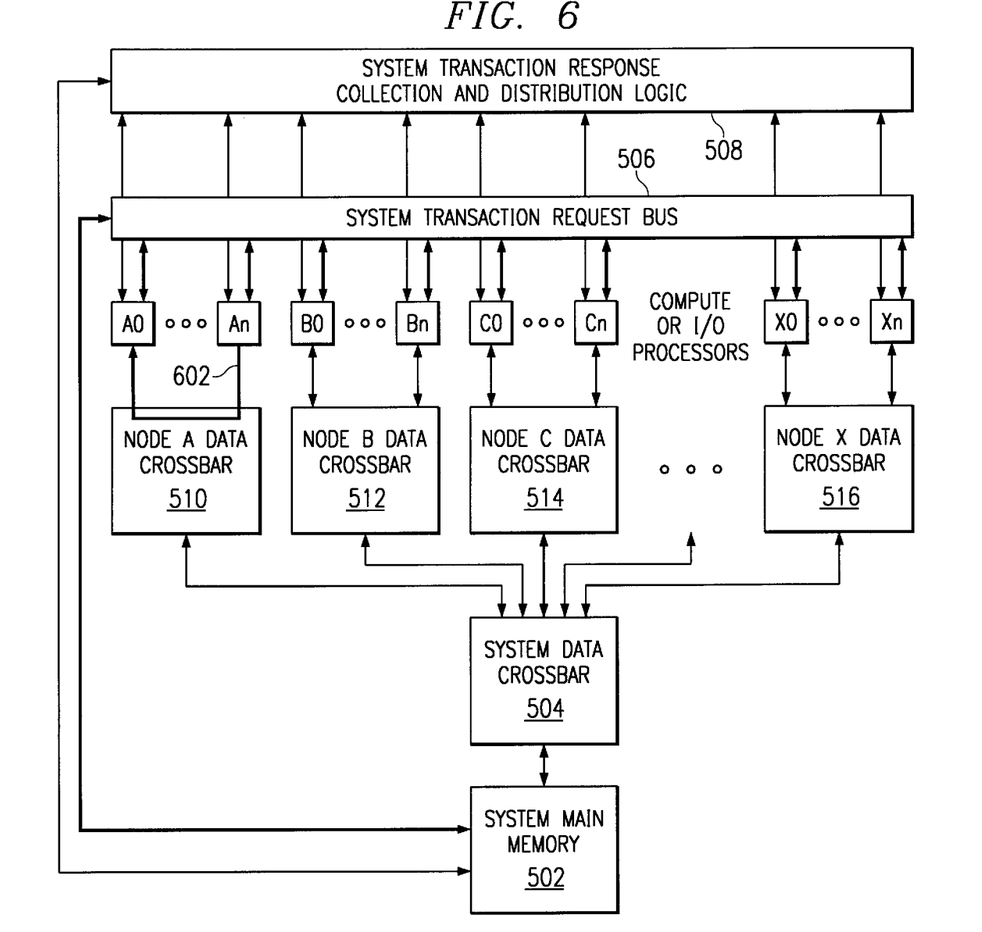
FIG. 6 depicts an example of a "local" data transfer 602 between processors A0 and An on node 510.

Data transfers between processors on the same node are generally the fastest type of data transfers due to the relatively fast access times of the processor caches and the fact that the data must pass through only a single crossbar data switch 510. This type of data transfer can be referred to as a "local" or "intra-node" data transfer. FIG. 6 depicts an example of a "local" data transfer 602 between processors A0 and An on node 510.

Figure 7:
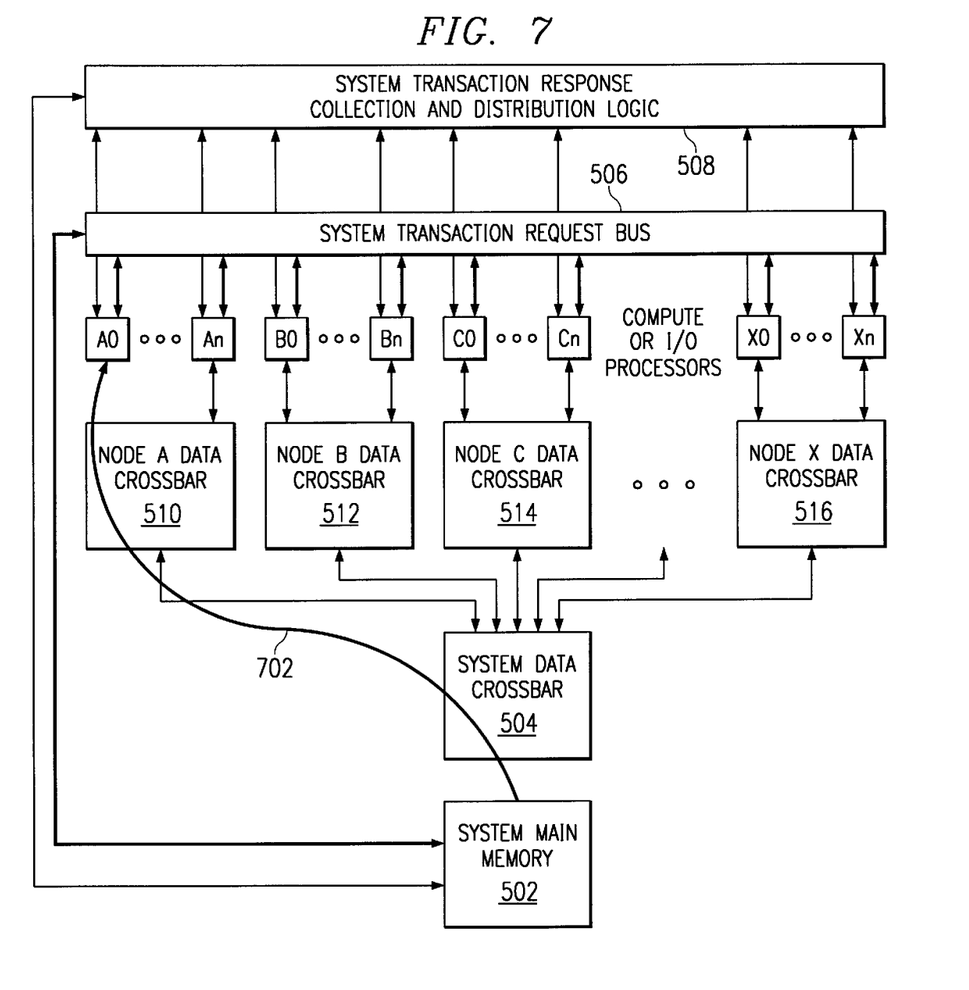
FIG. 7 illustrates an example of a "main memory" transfer 702 between main memory 502 and processor A0.

Data transfers between processors and main memory 502 are generally slower than local processor-to-processor transfers, because of the additional delay of the system-level crossbar switch 504 and the slower access time of main memory 502. These transfers are referred to as "main memory" transfers. An example of a "main memory" transfer 702 between main memory 502 and processor A0 is illustrated in FIG. 7.

Figure 8:
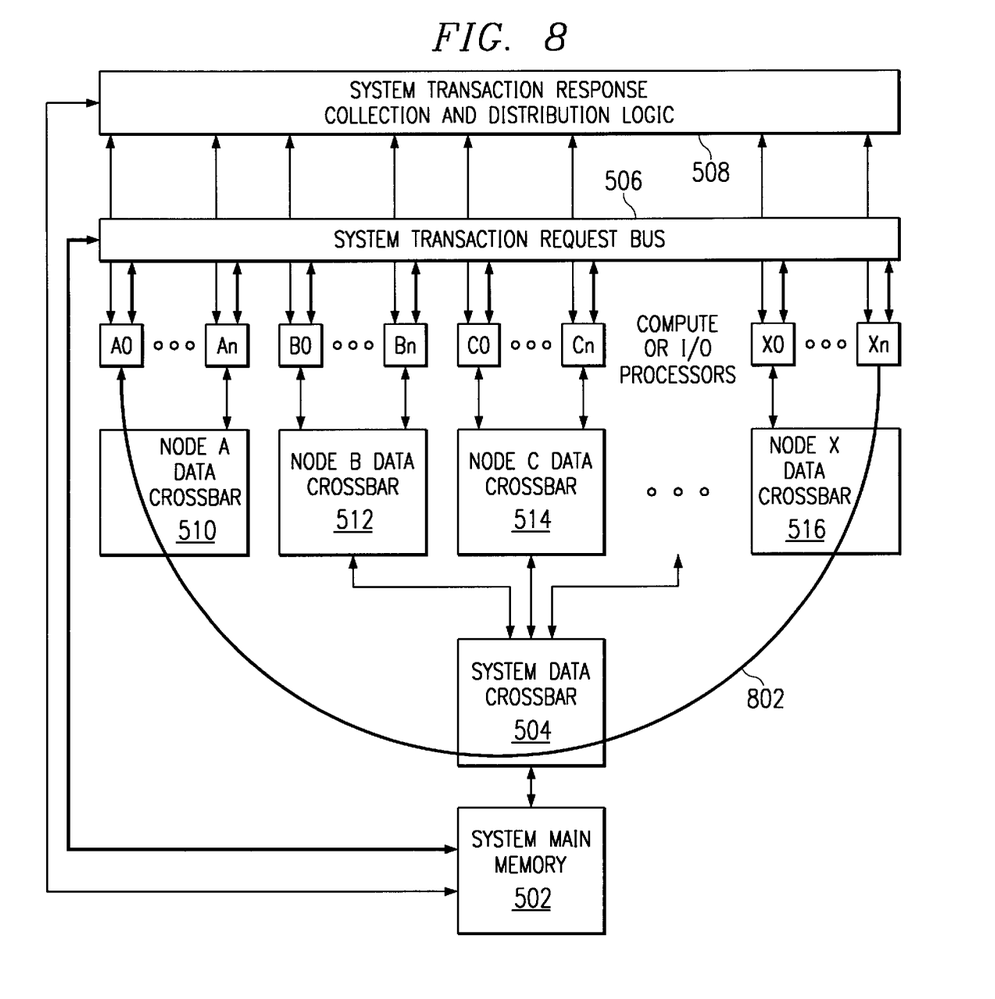
FIG. 8 illustrates an example of a "remote" or "inter-node" data transfer.

Data transfers between processors A0, An, B0, Bn, C0, Cn, X0, and Xn on different nodes 510, 512, 514, and 516, such as the data transfer 802 between processor A0 and processor Xn as depicted in FIG. 8, can be referred to as "remote" or "inter-node" transfers.

Data transfers from remote nodes are clearly slower than local processor-to-processor transfers due to the fact that the data must pass through two node-level crossbar switches, nodes 516 and 510 in the example illustrated in FIG. 8, as well as the system-level crossbar switch 504.

Accessing data from a remote processor may or may not be faster than accessing data directly from main memory 502. If the crossbar switching is efficient, and main memory 502 accesses are very slow compared to the remote processor's cache access, remote processor accesses may have substantially better latency than main memory 502. Hence, preferring such transfers in lieu of main memory 502 accesses whenever possible can improve overall system performance.

However, if accessing data from a remote processor is not significantly faster than accessing the data directly from main memory 502, it is preferable to use the main memory 502 access since it does not tie up the data path resources between the system crossbar 504 and the remote processor, leaving those resources free to transfer data for another transaction, thereby increasing overall system bandwidth and performance.

In multi-processor systems with local caches, when a bus device requests a piece of data, one of three possible conditions will occur:

(1) The requested data is not already present in the local caches of the other bus devices. In this situation, the data must be provided by the main memory.

(2) The requested data is present in the local cache of another bus device, which has also modified the data since it was fetched from main memory. In this situation, the requesting device must get the data from the device which has the modified copy. This is done either directly via a cache-to-cache transfer between the two bus devices (i.e., 6XX Modified-Intervention) or in an indirect fashion (i.e., force the other device to update the data in main memory and then allow the new requester to fetch data from main memory.

(3) The requested data is present in the local cache of other bus device(s), which have not altered data.

In case (3) above, the bus protocol allows one of the other bus devices to intervene in the memory access request and provide the data to the new requester directly via a cache-to-cache transfer. Since such "shared-intervention" transfers can typically be accomplished in less time than a main-memory access, substantial performance improvements can be realized.

Given the following system characteristics:

(1) Data transfers between processors on the same node can be accomplished with much shorter request-to-data latency than transfers between the processors and memory.

(2) Data transfers from processors on remote nodes are not substantially faster than accesses from main memory.

To optimize performance, it would be desirable to implement a selective form of shared intervention. If a processor having a shared copy of the requested data is on the same node as the requesting processor, the shared intervention is allowed to proceed. Otherwise, the shared-intervention is blocked and the request is handled by the main memory unit. This mechanism allows the system to minimize the use of system resources (i.e., data paths) while also utilizing the faster and most efficient method of servicing the data request.

Figure 9:
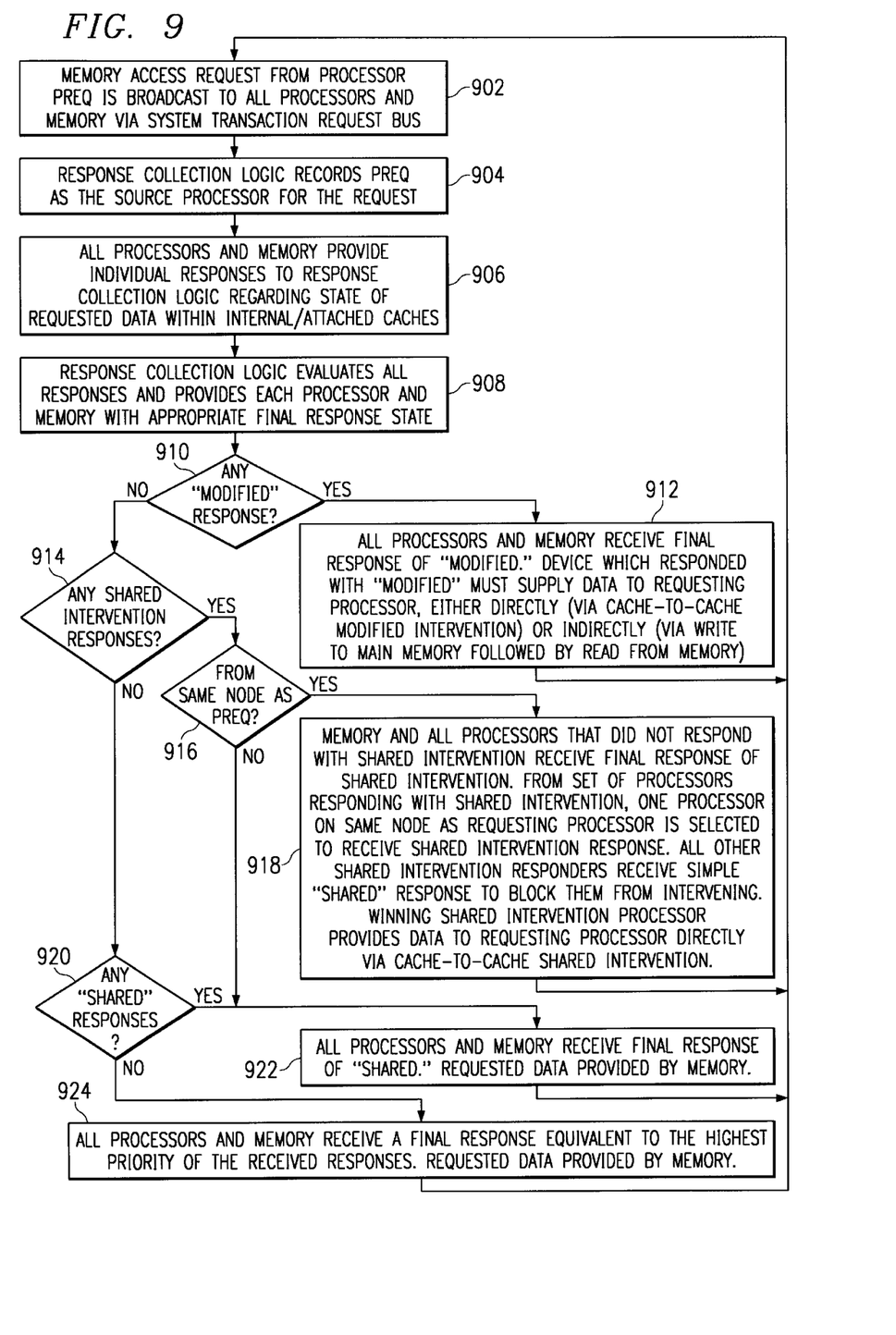
FIG. 9 shows a flow chart illustrating the selective shared intervention mechanism of the present invention.

Turning now to FIG. 9, there is shown a flow chart illustrating the selective shared intervention mechanism of the present invention. The selective shared intervention mechanism is implemented within the response collection and distribution unit 508 and determines which responding device has the closest logical proximity to the device requesting data. The device which is in the closest logical proximity to the device requesting the data is the device that results in the quickest transfer of data to the requesting device. For example, if the data has been modified, then the device containing the modified data is in the closest logical proximity to the requesting device. As another example, if another device on the same node as the requesting device contains the data and the data has not been modified elsewhere in the system, then the device on the same node as the requesting device having the data is in the closest logical proximity to the requesting device. When a transaction is initiated on the transaction request bus 506 (step 902), the response collection logic 508 records which processor originated the request (step 904). All processors A0, An, B0, Bn, C0, Cn, X0, and Xn and memory 502 provide individual responses to the response collection logic regarding the state of requested data within internal (or attached) caches (step 906). The cache coherency response signals between the response collection logic 508 and the processors/memory A0, An, B0, Bn, C0, Cn, X0, and Xn are logically grouped on a node-wise basis. Together, these two characteristics enable the response collection logic 508 to determine the locality of any intervention response and provide each processor A0, An, B0, Bn, C0, Cn, X0, and Xn and memory 502 with an appropriate final response state (step 908).

The response collection logic 508 executes a decision step to determine if any of the responses received from the processors A0, An, B0, Bn, C0, Cn, X0, and Xn indicate any "modified" response (the data has been modified) (step 910). If one of the responses indicates the data has been modified, then all processors A0, An, B0, Bn, C0, Cn, X0, and Xn and memory 502 receive a final response of "modified." The device which responded with "modified" supplies the data to the requesting processor, either directly (via cache-to-cache modified intervention) or indirectly (via write to main memory 502 followed by read from main memory 502) (step 912).

If no "modified" response is received, then the response collection logic 508 makes a determination as to whether any shared intervention responses have been received (step 914). If one or more shared intervention responses have been received, the response collection logic determines if one or more of the processors responding with a shared intervention response are located on the same node as the requesting processor (step 916).

If one or more processors responding with a shared intervention response resides on the same node as the requesting processor, a single shared-intervention "winner" is selected based on a fixed or round-robin prioritization between the processors on that node. The winning processor will receive a shared-intervention response, enabling it to provide the requested data via a local cache-to-cache transfer. Other processors which responded with a shared-intervention response (either on the same or on other nodes) are presented with a plain shared response, which block their intervention. All other bus devices are presented with a shared-intervention response. The winning shared intervention processor provides data to the requesting processor directly via cache-to-cache shared intervention (step 918).

If the only shared intervention responses are on different nodes than the requesting processor, all bus devices are presented with a shared response, which globally blocks the intervention and causes the main memory unit 502 to provide the data (step 922).

If no "modified" or shared intervention responses are received by the response collection logic 508, then response collection logic 508 determines if any "shared" responses have been received (step 920). If "shared" responses have been received, then all processors A0, An, B0, Bn, C0, Cn, X0, and Xn and memory 502 receive a final response of "shared." The requested data is then provided to the requesting processor by main memory 502 (step 922).

If no "modified", shared intervention, or "shared" responses have been received, then all processors A0, An, B0, Bn, C0, Cn, X0, and Xn and memory 502 receive a final response equivalent to the highest priority of the received responses and the requested data is provided to the requesting processor by main memory 502 (step 924).

Note that the selective shared intervention mechanism is made possible by the following enabling characteristics/capabilities:

(1) The response collection logic must be able to determine the source processor for each transaction.

(2) Response inputs and outputs between the processor and the response collection and distribution unit must be grouped on a processor-by-processor basis. Actually, these signals must be point-to-point connections (i.e., not shared among multiple processors).

(3) Unlike conventional response collection algorithms, which selected the final/global coherency response based solely on the relative priorities of the various responses, the mechanism described here also factors in the geographic proximity of the responding processor's relative to the requesting processor.

(4) Unlike conventional response distribution schemes, which broadcast the final/global response uniformly to all bus devices, the mechanism described herein must be able to provide a unique response to each processor. This is necessary to handle the case where multiple processors respond with shared interventions. In this situation, only the winning processor can be allowed to receive a shared intervention response, while the remaining shared intervention responds must get "shared" responses to prevent them from intervening.

It should again be noted, as mentioned above, that while the present invention has been described primarily with reference to multiple processors on a single data processing system, it can also be applied, as will be recognized by those skilled in the art, to two or more data processing systems where each data processing system has a plurality of nodes each having a plurality of processors. Such multiple data processing systems may be connected to each other via a network such as in system 100 depicted in FIG. 1.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for transferring data between devices in a computer system, comprising the steps of:
    broadcasting a request for data from a requesting device;
    identifying a response from each of a plurality of devices within the computer system, wherein each response identified indicates a location of a device and whether the device contains the data; and
    transferring the data from a selected device containing the data within the plurality of devices to the requesting device, wherein the selected device has a closest logical proximity to the requesting device.

2. The method as recited in claim 1, wherein the requesting device is a processor.

3. The method as recited in claim 1, wherein at least one of the plurality of devices is a processor.

4. The method as recited in claim 1, wherein one of the plurality of devices is a main memory unit.

5. The method as recited in claim 1, wherein a device on a same node as the requesting device is in the closest logical proximity to the requesting device if the device on the same node as the requesting device contains the data and if no device has modified the data.

6. The method as recited in claim 1, wherein a device that has modified the data is in the closest logical proximity to the requesting device if the data has been modified.

7. A method for transferring data between devices in a computer system, comprising the steps of:
    broadcasting a request for data from a requesting device;
    identifying a response from each of a plurality of devices within the computer system, wherein each response identified indicates a location of a device and whether the device contains the data; and
    transferring the data from a selected device containing the data within the plurality of devices to the requesting device, wherein the selected device has a closest logical proximity to the requesting device, wherein, if more than one device on a same node as the requesting device has the data and the data has not been modified, then a one of said more than one devices that has least recently been selected as a device to transfer data from is in the closest logical proximity to the requesting device.

8. A method for transferring data between devices in a computer system, comprising the steps of:
    broadcasting a request for data from a requesting device;
    identifying a response from each of a plurality of devices within the computer system, wherein each response identified indicates a location of a device and whether the device contains the data; and
    transferring the data from a selected device containing the data within the plurality of devices to the requesting device, wherein the selected device has a closest logical proximity to the requesting device, wherein, if more than one device on a same node as the requesting device has the data and the data has not been modified, then a one of said more than one devices that has been assigned a highest priority is in the closest logical proximity to the requesting device.

9. The method as recited in claim 1, wherein a main memory unit is in the closest logical proximity to the requesting device if no device on a same node as the requesting device has the data and if the data has not been modified.

10. A computer program product in a computer readable media for use in a data processing system, for transferring data between devices in a computer system, the computer program product comprising:
    first instructions for broadcasting a request for data from a requesting device;
    second instructions for identifying a response from each of a plurality of devices within the computer system, wherein each response identified indicates a location of a device and whether the device contains the data; and
    third instructions for transferring the data from a selected device containing the data within the plurality of devices to the requesting device, wherein the selected device has a closest logical proximity to the requesting device.

11. The computer program product as recited in claim 10, wherein the requesting device is a processor.

12. The computer program product as recited in claim 10, wherein at least one of the plurality of devices is a processor.

13. The computer program product as recited in claim 10, wherein one of the plurality of devices is a main memory unit.

14. The computer program product as recited in claim 10, wherein a device on a same node as the requesting device is in the closest logical proximity to the requesting device if the device on the same node as the requesting device contains the data and if no device has modified the data.

15. The computer program product as recited in claim 10, wherein a device that has modified the data is in the closest logical proximity to the requesting device if the data has been modified.

16. The computer program product as recited in claim 10, wherein a main memory unit is in the closest logical proximity to the requesting device if no device on a same node as the requesting device has the data and if the data has not been modified.

17. A computer program product in a computer readable media for use in a data processing system, for transferring data between devices in a computer system, the computer program product comprising:

first instructions for broadcasting a request for data from a requesting device;

second instructions for identifying a response from each of a plurality of devices within the computer system, wherein each response identified indicates a location of a device and whether the device contains the data; and third instructions for transferring the data from a selected device containing the data within the plurality of devices to the requesting device, wherein the selected device has a closest logical proximity to the requesting device, wherein, if more than one device on a same node as the requesting device has the data and the data has not been modified, then a one of said more than one devices that has least recently been selected as a device to transfer data from is in the closest logical proximity to the requesting device.

18. A computer program product in a computer readable media for use in a data processing system, for transferring data between devices in a computer system, the computer program product comprising:

first instructions for broadcasting a request for data from a requesting device;

second instructions for identifying a response from each of a plurality of devices within the computer system, wherein each response identified indicates a location of a device and whether the device contains the data; and third instructions for transferring the data from a selected device containing the data within the plurality of devices to the requesting device, wherein the selected device has a closest logical proximity to the requesting device, wherein, if more than one device on a same node as the requesting device has the data and the data has not been modified, then a one of said more than one devices that has been assigned a highest priority is in the closest logical proximity to the requesting device.

19. A system for transferring data between devices in a computer system, comprising:

means for broadcasting a request for data from a requesting device;

means for identifying a response from each of a plurality of devices within the computer system, wherein each response identified indicates a location of a device and whether the device contains the data; and means for transferring the data from a selected device containing the data within the plurality of devices to the requesting device, wherein the selected device has a closest logical proximity to the requesting device.

20. The system as recited in claim 19, wherein the requesting device is a processor.

21. The system as recited in claim 19, wherein at least one of the plurality of devices is a processor.

22. The system as recited in claim 19, wherein one of the plurality of devices is a main memory unit.

23. The system as recited in claim 19, wherein a device on a same node as the requesting device is in the closest logical proximity to the requesting device if the device on the same node as the requesting device contains the data and if no device has modified the data.

24. The system as recited in claim 19, wherein a device that has modified the data is in the closest logical proximity to the requesting device if the data has been modified.

25. The system as recited in claim 19, wherein a main memory unit is in the closest logical proximity to the requesting device if no device on a same node as the requesting device has the data and if the data has not been modified.

26. A system for transferring data between devices in a computer system, comprising:

means for broadcasting a request for data from a requesting device;

means for identifying a response from each of a plurality of devices within the computer system, wherein each response identified indicates a location of a device and whether the device contains the data; and means for transferring the data from a selected device containing the data within the plurality of devices to the requesting device, wherein the selected device has a closest logical proximity to the requesting device, wherein, if more than one device on a same node as the requesting device has the data and the data has not been modified, then a one of said more than one devices that has least recently been selected as a device to transfer data from is in the closest logical proximity to the requesting device.

27. A system for transferring data between devices in a computer system, comprising:

means for broadcasting a request for data from a requesting device;

means for identifying a response from each of a plurality of devices within the computer system, wherein each response identified indicates a location of a device and whether the device contains the data; and means for transferring the data from a selected device containing the data within the plurality of devices to the requesting device, wherein the selected device has a closest logical proximity to the requesting device, wherein, if more than one device on a same node as the requesting device has the data and the data has not been modified, then a one of said more than one devices that has been assigned a highest priority is in the closest logical proximity to the requesting device.

28. A data processing system, comprising:

a bus;

a logic block connected to said bus; and a plurality of devices connected to said bus;

wherein said logic block is configured to receive a request for data from a requesting device that is one of said plurality of devices and determines from the plurality of devices a transmitting device that contains the requested data which will result in the quickest transfer of data to the requesting device.

29. The data processing system as recited in claim 28, wherein at least one of said plurality of devices is a processor.

30. The data processing system as recited in claim 28, wherein at least one of said plurality of devices is a main memory unit.

31. A data processing system, comprising:

a bus;

a logic block connected to said bus;

a plurality of devices connected to said bus; and a plurality of nodes, wherein said logic block is configured to receive a request for data from a requesting device that is one of said plurality of devices and determines from the plurality of devices a transmitting device that contains the requested data which will result in the quickest transfer of data to the requesting device;

wherein said plurality of devices is organized into sets of devices;

wherein each set of devices contains more than one device; and each device in each set of devices is connected to a same node of said plurality of nodes.

32. A method for transferring data between devices in a computer system, comprising the steps of:

broadcasting a request for data from a requesting device to a plurality of devices in said system;

receiving, in response to said broadcast, a response from each of said plurality of devices indicating the location of a device within the plurality of devices and whether said device contains said data; and transferring the requested data to the requesting device from a selected device within the plurality of devices in within the selected device has a quickest transfer of data as compared to other devices in the plurality of devices.

33. The method as recited in claim 32, wherein the requesting device is a processor.

34. The method as recited in claim 32, wherein at least one of said plurality of devices is a processor.

35. The method as recited in claim 32, wherein at least one of said plurality of devices is a main memory unit.

* * * * *

UNITED STATES PATENT AND TRADEMARK OFFICE
CERTIFICATE OF CORRECTION

PATENT NO. : 6,484,220 B1 Page 1 of 1
DATED : November 19, 2202
INVENTOR(S) : Alvarez, II et al.

It is certified that error appears in the above-identified patent and that said Letters Patent is hereby corrected as shown below:

<u>Column 14,</u>
Line 7, delete "within" and insert -- which --.

Signed and Sealed this

Thirteenth Day of May, 2003

JAMES E. ROGAN
*Director of the United States Patent and Trademark Office*